Aug. 22, 1944.    J. COUËLLE    2,356,386
STRUCTURAL MEMBER
Filed Feb. 26, 1942
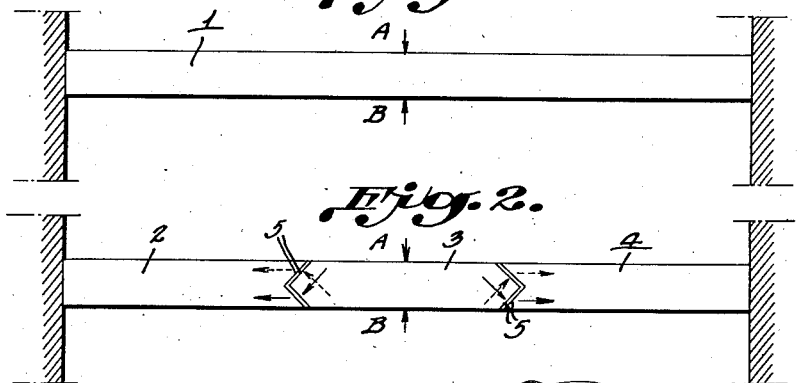
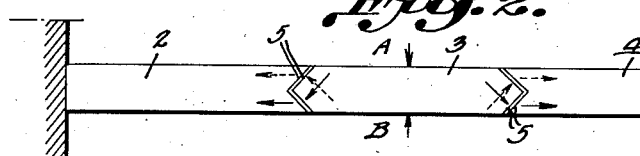
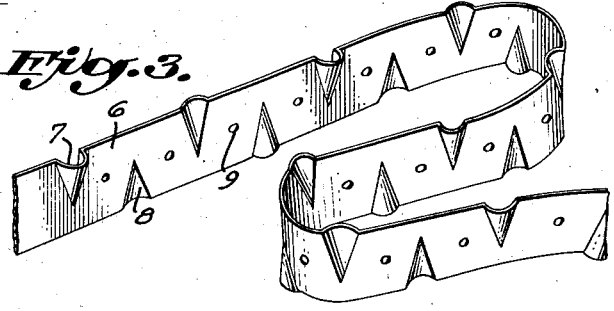
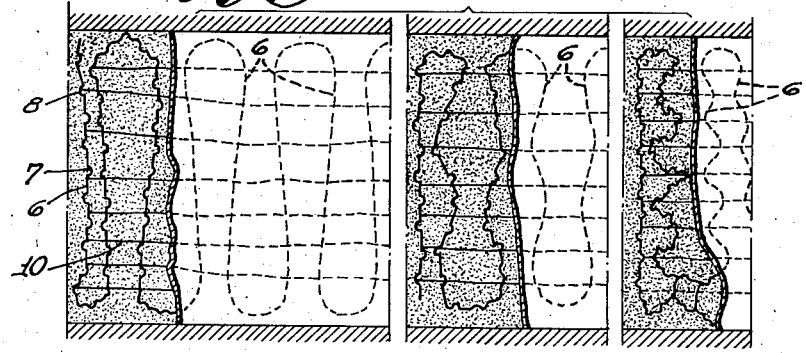
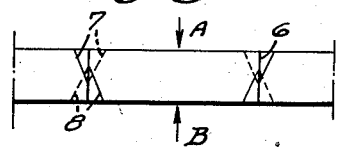
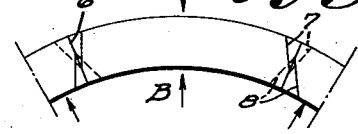
Inventor:
JACQUES COUELLE
By [signature]
Attorney.

Patented Aug. 22, 1944

2,356,386

UNITED STATES PATENT OFFICE 2,356,386

STRUCTURAL MEMBER

Jacques Couëlle, Marseille, France; vested in the Alien Property Custodian

Application February 26, 1942, Serial No. 432,392
In France May 19, 1941

15 Claims. (Cl. 72—59)

The invention relates to improvements in reinforced concrete and similar material structural members, the primary object of the invention being to overcome the tendency of such members to weaken or break under loads and shocks by endowing the members with a degree to flexibility in such a way that the effects of strains and shearing stresses, whether sudden or continuous, imposed on the members are resolved and distributed throughout the members in such a way that the members have substantially greater strength and flexibility than are afforded by the molecular cohesiveness alone of the material of which the members are made.

Another important object of the invention is to provide reinforced concrete or similar material structural members in which the mass of reinforcing metal usually embedded in the concrete or similar material is substantially reduced or eliminated, by the employment in their stead of relatively light weight, small cross section reinforcing elements which need not necessarily be of metal, whereby the total weight is little more than that of an unreinforced member of this type, and the cost is substantially less.

The foregoing and other important objects and advantages of the invention will be apparent from the following description and the appended drawing, wherein illustrative embodiments of the invention are set forth, without intent, however, to limit application of the invention thereto, except as defined in the subjoined claims.

In the drawing:

Figure 1 is a diagrammatic side view showing an ordinary concrete or similar material structural member, such as a beam, illustrating the application of load or shock forces thereto indicated by the arrows.

Figure 2 is a similar view of a similar type of structural member modified in accordance with the present invention and illustrating the resolving and redistribution of the applied forces.

Figure 3 is an enlarged fragmentary perspective view of an elastic band separator according to the present invention.

Figure 4 is a fragmentary, composite sectional view illustrating different ways of employing the separators in conjunction with supporting bands used to position the separators in the moulding of the structural member.

Figure 5 is a diagrammatic view showing another employment of separators according to the invention, and, Figure 6 is a similar view showing employment of such separators in a curved structural member.

Referring in detail to the drawing, the numeral 1 generally designates a cast concrete or similar material beam which for purposes of illustration, is shown as subjected to the forces A or B indicated by the accompanying arrows, the beam being unreinforced and being supported at substantially spaced points or at its ends. In the ordinary arrangement of such a beam, shown in Figure 1, relatively great forces A or B definitely tend to weaken or break the beam 1, as is well known, due in part to the natural inflexibility of the concrete or the like, and the fact that the strength of the beam depends almost entirely upon the molecular cohesiveness of the concrete of which it is made.

In accordance with the present invention, the beam 1 is in effect subdivided into a number of sections, such as the sections 2, 3 and 4 of Figure 2, by the use of flexible separators 6 which are embedded in the beam at the time of casting or moulding the beam. The separators are so formed and arranged that inclined wedges and cooperating indentations are produced in the meeting faces of the sections, which operate mechanicaly to cause the sections to move relative to each other in a manner to resolve substantial portions of the force A or B into compressive forces acting in different directions upon and distributed among the sections 2, 3 and 4.

The form of separator 6 shown in Figure 3 of the drawing consists of a relatively thin flexible band which can be of metal, cardboard, strong paper, or other similarly suitable material. Gussets or indentations 7 and 8 are formed in the opposite edges of the band and are oppositely disposed in staggered relation. The band 6 is further provided with openings 9 through which are passed bands 10 having sufficient tension to maintain the separators 6 in the desired configurations and relationships while the structural member is being cast or moulded. The bands 9 also contribute to the unification of the finished member and aid in the distribution of forces applied thereto and exerted on the separators.

The gussets or indentations 7 and 8, by their shape and relative arrangement, produce on the meeting faces of the adjoining sections, mated indentations and projections, which have mechanically effective inclined faces which can work upon each other to resolve the applied forces into forces acting in directions angulated with respect to the direction of application of the forces, with the advantageous results described hereinabove. The multiplicities of mated indentations and projections provided as described, acting as tenons, provide structurally adequate connections between the sections 2, 3 and 4, for example, which nevertheless can give in response to all normal stresses on the structural member in a manner to preserve the molecular integrity of the sections and increase the strength and serviceability of the structural member as a unit.

The present invention is adaptable to the construction of objects other than structural beams, such as walls, vaults, roofings, floorings, basins, reservoirs, and the like. In these adaptations the procedure is the same as in ordinary concrete or similar material constructions, adequate frame means being established to support the separators 6 and the bands 10 during the moulding or casting.

I claim:

1. The method of making a load supporting member which comprises casting said member of a self-hardening material and separating said member into a plurality of transverse sections by incorporating in the cast member section separating means, said means having irregularities therein arranged to provide in the meeting faces of said sections complementary configurations which prevent slippage of one section past the other.

2. The method of making a load supporting member which comprises casting said member of a self-hardening material, the member having longitudinal sides and separating said member into a plurality of transverse sections by incorporating in the cast member a serpentine tape, the turns of said tape being adjacent said longitudinal sides, said tape having irregularities therein arranged to provide in the meeting faces of said sections complementary configurations which prevent slippage of one section past the other.

3. The method of making a load supporting member which comprises casting said member of a self-hardening material and separating said member into a plurality of transverse sections by incorporating in the cast member a section separating tape, said tape having irregularities therein arranged to provide in the meeting faces of said sections complementary configurations which prevent slippage of one section past the other.

4. A monolithic structural member comprising a cast body of self-hardening material having embedded therein separating means consisting of at least one flexible band having longitudinally spaced portions of the opposite edges thereof deformed in a manner providing complementary indentations and projections along the opposite edges of the band and being oppositely inclined with respect to the plane of the band, the portions of the material of the said body filling the indentations and conforming to the projections defining companion interlocking wedges having inclined surfaces arranged to act upon each other in the general direction of application of the loading forces and shocks impinged on the body and resolve the same into compressive forces acting through the body in several directions different from the direction of impingement of said loading forces and shocks.

5. A monolithic structural member comprising a cast body of self-hardening material having embedded therein separating means consisting of at least one flexible band having longitudinally spaced portions of the opposite edges thereof deformed in a manner providing complementary indentations and projections along the opposite edges of the band and being oppositely inclined with respect to the plane of the band, the portions of the material of the said body filling the indentations and conforming to the projections defining companion interlocking wedges having inclined surfaces arranged to act upon each other in the general direction of application of the loading forces and shocks impinged on the body and resolve the same into compressive forces acting through the body in several directions different from the direction of impingement of said loading forces and shocks, said band having at least one substantial portion of the length thereof running across said body and transversely with respect to the general direction of impingement of the loading and shock forces to be resolved.

6. A monolithic structural member comprising a cast body of self-hardening material having embedded therein separating means consisting of at least one flexible band having longitudinally spaced portions of the opposite edges thereof deformed in a manner providing complementary indentations and projections along the opposite edges of the band and being oppositely inclined with respect to the plane of the band, the portions of the material of the said body filling the indentations and conforming to the projections defining companion interlocking wedges having inclined surfaces arranged to act upon each other in the general direction of application of the loading forces and shocks impinged on the body and resolve the same into compressive forces acting through the body in several directions different from the direction of impingement of said loading forces and shocks, said band having at least one substantial portion of the length thereof running across the body substantially transversely of the direction of imposition of the expected loading forces and shocks, with some of the indentations and projections sloping with respect to the direction of the impinging forces, whereby the corresponding interlocked wedges act upon each other so as to tend to move the portions of the body separated by the said portion of the band in opposite directions with respect to each other.

7. A monolithic structural member comprising a body of self-hardening material cast with separating means embedded therein, said separating means comprising at least one flexible band having flights thereof running across the body and transversely of the general direction of application of the loading forces and shocks which the body is intended to sustain, the said flights being laterally spaced from each other to define body sections therebetween, a multiplicity of wedge forming elements on the flights of the band comprising undulations formed in the opposite edges of the band comprising sets of complementary indentations and projections sloped with respect to the direction of application of the loading forces and shocks which the body is intended to sustain, the portions of the body cast into and around said indentations and projections constituting coacting wedges tending to drive the adjacent body sections in directions away from each other and in directions divergent from the said direction of the loading forces and shocks, when the latter are applied.

8. A monolithic structural member comprising a body of self-hardening material cast with separating means embedded therein, said separating means comprising at least one flexible band having flights thereof running across the body and transversely of the general direction of application of the loading forces and shocks which the body is intended to sustain, the said flights being laterally spaced from each other to define body sections therebetween, a multiplicity of wedge forming elements on the flights of the band comprising undulations formed in the opposite edges of the band comprising sets of complementary indentations and projections sloped with respect to the direction of application of the loading forces and shocks which the body is intended to sustain, the portions of the body cast into and around said indentations and projections constituting coacting wedges tending to drive the adjacent body sections in directions away from each other and in directions divergent from the said direction of the loading forces and shocks, when the latter are applied, said band being serpentine, the sets of complementary indentations and projections being arranged at frequent intervals along the band.

9. A monolithic structural member comprising a body of self-hardening material cast with separating means embedded therein, said separating means comprising at least one flexible band having flights thereof running across the body and transversely of the general direction of application of the loading forces and shocks which the body is intended to sustain, the said flights being laterally spaced from each other to define body sections therebetween, a multiplicity of wedge forming elements on the flights of the band comprising undulations formed in the opposite edges of the band comprising sets of complementary indentations and projections sloped with respect to the direction of application of the loading forces and shocks which the body is intended to sustain, the portions of the body cast into and around said indentations and projections constituting coacting wedges tending to drive the adjacent body sections in directions away from the said direction of the loading forces and shocks, when the latter are applied, said sets of complementary indentations and projections being staggered with respect to the opposite edges of the band.

10. A monolithic structural member comprising a body of self-hardening material cast with separating means embedded therein, said separating means comprising at least one flexible band having flights thereof running across the body and transversely of the general direction of application of the loading forces and shocks which the body is intended to sustain, the said flights being laterally spaced from each other to define body sections therebetween, a multiplicity of wedge forming elements on the flights of the band comprising undulations formed in the opposite edges of the band comprising sets of complementary indentations and projections sloped with respect to the direction of application of the loading forces and shocks which the body is intended to sustain, the portions of the body cast into and around said indentations and projections constituting coacting wedges tending to drive the adjacent body sections in directions away from the said direction of the loading forces and shocks, when the latter are applied, said sets of complementary indentations and projections being staggered with respect to the opposite edges of the band and being alternated toward opposite sides of the band along its length.

11. A monolithic structural member comprising a body of self-hardening material cast with separating means embedded therein, said separating means comprising at least one flexible band having flights thereof running across the body and transversely of the general direction of application of the loading forces and shocks which the body is intended to sustain, the said flights being laterally spaced from each other to define body sections therebetween, a multiplicity of wedge forming elements on the flights of the band comprising undulations formed in the opposite edges of the band comprising sets of complementary indentations and projections sloped with respect to the direction of application of the loading forces and shocks which the body is intended to sustain, the portions of the body cast into and around said indentations and projections constituting coacting wedges tending to drive the adjacent body sections in directions away from each other and in directions divergent from the said direction of the loading forces and shocks, when the latter are applied, the flexible band being of metal.

12. A monolithic structural member comprising a body of self-hardening material cast with separating means embedded therein, said separating means comprising at least one flexible band having flights thereof running across the body and transversely of the general direction of application of the loading forces and shocks which the body is intended to sustain, the said flights being laterally spaced from each other to define body sections therebetween, a multiplicity of wedge forming elements on the flights of the band comprising undulations formed in the opposite edges of the band comprising sets of complementary indentations and projections sloped with respect to the direction of application of the loading forces and shocks which the body is intended to sustain, the portions of the body cast into and around said indentations and projections constituting coacting wedges tending to drive the adjacent body sections in directions away from each other and in directions divergent from the said direction of the loading forces and shocks, when the latter are applied, the flexible band being of non-metallic material.

13. A monolithic structural member comprising a body of self-hardening material cast with separating means embedded therein, said separating means comprising at least one flexible band having flights thereof running across the body and transversely of the general direction of application of the loading forces and shocks which the body is intended to sustain, the said flights being laterally spaced from each other to define body sections therebetween, a multiplicity of wedge forming elements on the flights of the band comprising undulations formed in the opposite edges of the band comprising sets of complementary indentations and projections sloped with respect to the direction of application of the loading forces and shocks, when the latter are applied, the flexible band being of paper.

14. A reinforcing element for cast bodies of concrete and the like, said reinforcing element comprising a flexible band of serpentine form having portions along the opposite edges thereof offset to define sets of complementary indentations and projections, the indentations and projections on the two edges sloping in opposite directions with respect to the plane of the band.

15. A reinforcing element for cast bodies of concrete and the like, said reinforcing element comprising a flexible band of serpentine form having portions along the opposite edges thereof offset to define sets of complementary indentations and projections, the indentations and projections on the two edges sloping in opposite directions with respect to the plane of the band, said indentations and projections being substantially semi-conical in shape.

JACQUES COUËLLE.